United States Patent
Gadkaree et al.

(10) Patent No.: US 7,553,349 B2
(45) Date of Patent: Jun. 30, 2009

(54) COMPOSITE COATINGS FOR THIN-WALLED CERAMIC HONEYCOMB STRUCTURES

(75) Inventors: Kishor Purushottam Gadkaree, Big Flats, NY (US); Susan Clair Lauderdale, Painted Post, NY (US); Joseph Frank Mach, Lindley, NY (US); Deborah Lynn Shanley, Wellsboro, PA (US)

(73) Assignee: Corning Incorporated, Corning, NY (US)

( * ) Notice: Subject to any disclaimer, the term of this patent is extended or adjusted under 35 U.S.C. 154(b) by 417 days.

(21) Appl. No.: 11/213,179

(22) Filed: Aug. 26, 2005

(65) Prior Publication Data

US 2007/0277489 A1    Dec. 6, 2007

(51) Int. Cl.
*B01D 46/00* (2006.01)
*B01D 39/20* (2006.01)
*F01N 3/022* (2006.01)

(52) U.S. Cl. .............. 55/523; 55/282.3; 55/385.3; 55/524; 55/DIG. 5; 55/DIG. 10; 55/DIG. 30; 60/297; 60/299; 60/311; 95/273; 95/278; 422/180; 502/439; 264/628; 264/630; 264/631; 264/638

(58) Field of Classification Search ............... 55/282.2, 55/282.3, 385.3, 523, 524, DIG. 5, DIG. 10, 55/DIG. 30; 60/297, 299, 301, 311; 95/273, 95/278; 422/177, 180; 423/212, 213.2, 239.1; 502/344, 439; 264/628, 630, 631, 638
See application file for complete search history.

(56) References Cited

U.S. PATENT DOCUMENTS

| | | | |
|---|---|---|---|
| 3,885,977 A | | 5/1975 | Lachman et al. ............ 106/62 |
| 4,294,806 A | | 10/1981 | Abe et al. ............ 423/239 |
| 5,124,303 A | * | 6/1992 | Kobayashi et al. ............ 502/241 |
| 5,391,530 A | * | 2/1995 | Nowitzki et al. ............ 502/439 |
| 5,686,377 A | * | 11/1997 | Banno et al. ............ 502/330 |
| 5,863,855 A | * | 1/1999 | Nojima et al. ............ 502/309 |
| 6,242,072 B1 | | 6/2001 | Ueda et al. ............ 428/116 |
| 6,352,756 B1 | | 3/2002 | Ichikawa et al. ............ 428/116 |
| 6,506,336 B1 | * | 1/2003 | Beall et al. ............ 264/630 |
| 6,827,754 B2 | * | 12/2004 | Suwabe et al. ............ 55/523 |
| 7,052,532 B1 | * | 5/2006 | Liu et al. ............ 55/523 |

FOREIGN PATENT DOCUMENTS

| | | | |
|---|---|---|---|
| EP | 1 498 179 | | 1/2005 |
| JP | 54-71791 | | 8/1979 |
| JP | 63-162028 | * | 7/1988 |
| JP | 11-57489 | * | 3/1999 |

\* cited by examiner

*Primary Examiner*—Jason M Greene
(74) *Attorney, Agent, or Firm*—Joseph M. Homa

(57) ABSTRACT

A ceramic honeycomb product comprising a thin-walled ceramic honeycomb structure incorporating a plurality of parallel channels bounded by thin channel walls traversing the body from a first end face to a second end face thereof; and a composite coating disposed on at least one end face of the structure comprising a powder of an abrasion-resistant ceramic dispersed in a dried siliceous matrix.

8 Claims, 1 Drawing Sheet

COMPOSITE COATINGS FOR THIN-WALLED CERAMIC HONEYCOMB STRUCTURES

BACKGROUND OF THE INVENTION

The present invention relates to honeycomb structures used as catalyst supports, and more particularly to ceramic honeycomb structures provided with protective coatings to improve the resistance of the structures to erosion or other physical damage during manufacture or while in service as catalyst carriers in exhaust systems adapted to purify combustion engine exhaust gases.

The exhaust gases emitted by internal combustion engines utilizing hydrocarbon fuels such gasoline or diesel fuel normally include a number of pollutants including unburned hydrocarbons, carbon monoxide, and nitrogen oxides (NOx). The automotive industry has developed complex catalytic exhaust treatment systems designed to substantially remove most of these harmful constituents from the engine exhausts.

Channeled honeycomb catalyst supports, typically in the form of extruded ceramic honeycombs composed predominantly of cordierite, have long been preferred for use as substrates to support catalytically active components effective to successfully treat engine exhaust streams. Cordierite is a particularly preferred material on account of its low thermal expansion, high thermal shock resistance, and high refractoriness. The production of cordierite ($2MgO.2Al_2O_3.5SiO_2$) ceramics from mineral batches containing sources of magnesium, aluminum and silicon such as clay and talc is well known. U.S. Pat. No. 3,885,977, for example, discloses the manufacture of thermal-shock-resistant cordierite honeycomb ceramics from clay/talc batches by extruding the batches and firing the extrudates to provide honeycomb structures with very low thermal expansion coefficients.

Manufacturers work continuously to optimize the characteristics of cordierite substrates to enhance their utility as catalyst carriers. One important advance has been the development of so-called thin-walled cordierite honeycombs. These are honeycombs formed with channel walls of substantially decreased thickness, generally not exceeding 125 µm in wall thickness and more typically in the range of 20-100 µm in wall thickness. Demand for honeycomb catalyst supports having very thin cell walls is increasing in response to legislation requiring higher conversion efficiencies in catalytic converters for the automobile market. Thinner cell walls reduce the mass of the substrates, resulting in faster catalyst light-off times. In addition, higher geometric surface areas may be achieved without an increase in the mass of the substrate, and without an increase in exhaust gas back pressures that can degrade engine efficiency. Examples of cordierite honeycomb structures with ultra-thin cell walls are disclosed, for example, in U.S. Pat. No. 6,506,336.

One disadvantage associated with the use of these very thin-walled ceramic honeycombs is that they are subject to chipping or erosion due to the relative fragility of ceramic material of slight thickness. Chipping can be caused by handling of the honeycombs during the various processes of applying catalyst coatings to the channel walls; erosion can occur in later use as the inlet ends of the honeycombs are impacted by particles entrained in the exhaust gas streams passing through the structures. The problem of erosion is in fact magnified in those automotive exhaust treatment applications where the catalytic converter is moved closer to the engine exhaust manifold.

It has been generally recognized that the protective treatment of the inlet faces of such ceramic catalyst supports can help to address these problems. Examples of some of the proposed honeycomb treatments are disclosed in U.S. Pat. Nos. 4,294,806, 6,242,072, and 6,352,756. Other approaches are disclosed in published Japanese patent applications JP 54-71791 and JP 2004-000907.

However, up to the present time, problems with existing approaches remain, and no truly satisfactory solution has been provided. Among the remaining problems are those of chemical and/or thermal incompatibilities between the ceramic honeycombs and the protective coating materials that may be applied to the honeycomb end faces. Any successful protective coating must adhere well to honeycomb surfaces over a broad range of temperatures, and must not interfere with the favorable high temperature properties of the honeycombs or the performance of subsequently applied catalyst coatings. Another problem is that of cost. Coating processes that require high temperature firing steps to cure or bond protective coatings to the honeycombs are uneconomic, and also risk physical or chemical degradation of the underlying cordierite or other ceramic wall structures. Yet another problem is that of increased engine exhaust back pressures arising from the use of thick protective coatings that decrease honeycomb channel diameters and thereby increase exhaust gas flow pressure drops across the honeycombs.

SUMMARY OF THE INVENTION

The present invention provides an improved ceramic honeycomb structure incorporating a composite protective coating, and a process for its manufacture, that offers substantial improvements in honeycomb durability against damage during manufacture or in the course of use. In particular, the toughness and durability of the protective coatings of the invention are such that they substantially improves the erosion resistance of the coated ceramic honeycomb article, even in applications such as close-coupled catalytic converter configurations where severe erosion conditions may be encountered.

Generally characterized, the invention involves the application of an inorganic composite coating to at least selected end faces of a ceramic honeycomb structure, with the application being advantageously carried out at room temperature and without any need for a high temperature sintering or bonding step to cure the protective coating. The resulting composite coating is substantially free of organic binders, yet sufficiently strong and durable after a simple drying step to impart significantly enhanced erosion resistance to the coated honeycomb.

In a first aspect, therefore, the invention includes a ceramic honeycomb article comprising a ceramic honeycomb structure, that structure being conventionally formed to include a plurality of parallel channels bounded by thin ceramic channel walls. The channels and channel walls traverse the honeycomb structure from a first end face to a second end face thereof, the channels being open-ended to allow for the passage of engine exhaust gases therethrough.

The article further comprises a composite coating disposed on at least one end face of the ceramic honeycomb structure, that coating comprising a powder of an abrasion-resistant ceramic material dispersed within a dried siliceous matrix. Illustrative examples of suitable ceramic materials for inclusion in the composite coating are silicon carbide, vermiculite, and cordierite, these materials being representative of those imparting substantial improvements in erosion resistance to the underlying ceramic honeycomb structure.

In another aspect the invention provides a method for improving the durability of a ceramic honeycomb structure.

In accordance with that method, a flowable suspension comprising a powdered abrasion-resistant ceramic dispersed in a water-based liquid vehicle selected from the group consisting of silicate solutions and silica suspensions is first applied as a liquid coating layer to at least one end face of the ceramic structure. Thereafter, the coating layer is dried to substantially remove the water component of the silica-based solution or suspension, thus to provide a substantially water-free composite coating of the powdered ceramic in a dried siliceous matrix.

Among the advantages of ceramic honeycomb articles produced as described are excellent resistance to abrasion damage in use, and reduced process complexity and cost since high abrasion resistance in the article can be achieved through a simple coating process that avoids expensive coating materials and high-temperature coating curing steps. In addition, the coating process of the invention provides honeycomb structures that do not unacceptably increase exhaust stream back pressures arising from presence of the composite coatings on honeycomb end faces, since only relatively thin composite coatings are required. Other features and advantages of the invention will become apparent from the following detailed description thereof.

DESCRIPTION OF THE DRAWINGS

The invention is further described below with reference to the appended drawings, wherein.

DETAILED DESCRIPTION

Figure 1:
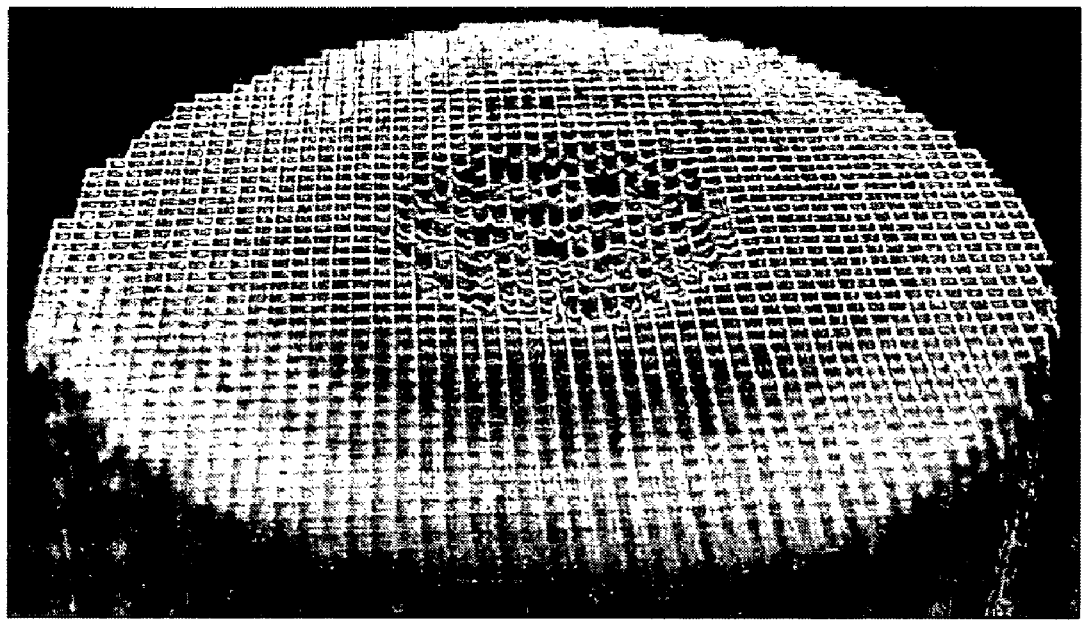
FIG. 1 illustrates a ceramic honeycomb structure of the prior art after exposure to a flowing gas stream comprising abrasive particles.

The method of the invention can be adapted to the protection of wide variety of ceramic honeycomb compositions and geometries, including, for example, honeycombs having compositions selected from the group of cordierite, alumina, mullite, silicon nitride, silicon carbide, calcium aluminate, aluminum titanate, or the like. Such honeycombs have been fabricated with channel wall thicknesses ranging from as low as 20 µm to as high as 1 mm and any of these designs can be treated in accordance with the invention to improve the resistance of the ceramic to chipping or erosion damage. Nevertheless, the invention has particular application to the protection of thin-walled honeycombs of the type currently favored for use as catalyst supports in advanced automotive emissions control systems. Thus protectively coated ceramic honeycomb structures formed at least predominantly (greater than 50%) of cordierite and having channel wall thicknesses in the 20-100 µm range constitute particularly preferred embodiments of the invention.

The composition of the abrasion resistant ceramic powder to be incorporated into the composite coatings of the invention can likewise vary in composition. Surprisingly, even powders of the same composition as the underlying ceramic honeycomb can impart a useful degree of erosion protection when incorporated into composite coating systems in accordance with the invention, although greater improvements in protection can generally be achieved using powders specially selected for the purpose. Without intending to be bound by theory, a possible mechanism for the improved erosion protection observed could be the higher energy required to generate fracture surfaces at particle-matrix interfaces within the composite coating layer, versus the energy required to erode single-phase materials. Examples of powder compositions particularly effective in combination with water-based siliceous binders to impart high erosion resistance to thin-walled cordierite honeycomb structures include silicon carbide and vermiculite.

The water-based siliceous solution or suspension employed as the liquid medium for the composite coating solution should be one sufficiently low in viscosity to both permit good wetting of the ceramic honeycomb structure, and allow the deposition of a relatively thin coating layer. These characteristics are needed in order to provide a well-bonded coating that still minimizes obstruction of the honeycomb channels that could unacceptably increase coated honeycomb gas flow pressure drops. At the same time, the siliceous solution or suspension should have a sufficient concentration of siliceous binder material that a silica-based matrix of sufficient mass and bulk to form a durable, chip-resistant composite coating is developed upon drying. Suitable concentrations of binder material can be provided for example, in both water-based colloidal silica suspensions and in water-based soluble silicate solutions. Solutions providing particularly suitable properties for coating application and matrix development include commercially available aqueous alkali silicate solutions.

Generally, the concentration of inorganic powder present in suitably flowable composite coating solutions employing commercially available aqueous silica-based suspensions or solutions will not exceed about 60% by weight. Typical composite coating formulations will have viscosities below about 1000 centipoises, since at higher viscosities the preparations are too thick to coat.

The particular method employed for applying flowable composite coating formulations to ceramic honeycomb structures is not critical, being selected principally on the basis of the coating coverage required. Depending upon the particular end use intended for the coated ceramic article, the application of the coating formulation may be limited to one or both end surfaces of the ceramic honeycomb structure only, or extended to cover peripheral outer skin surfaces or interior channel wall surfaces thereof as well. Thus spraying, dipping, brushing, rolling or other methods may be used as the intended coverage of the composite coating on the structure may require.

Following the application of the coating mixture to the selected surfaces of the ceramic honeycomb, the applied coating layer may be dried to remove the water component of the mixture by any suitable means. Hot air drying is generally useful; accelerated drying methods including microwave or dielectric drying can additionally or alternatively be used depending upon the dielectric properties of the coating mixture selected. In any case, removal of most, or more preferably substantially all, of the water present in the coating mixture will promote the necessary development of a durable and well-bonded composite coating on any of the known porous ceramic honeycomb materials that may be selected for coating.

The resulting composite coating comprises two distinct and identifiable phases, the ceramic powder comprising a crystalline phase which can be identified as to its composition, for example, by x-ray diffraction analyses, and a siliceous phase that is most typically amorphous or non-crystalline rather than crystalline when examined, for example, by scanning electron microscopy or x-ray microanalysis.

Whether derived from silicate solutions or silica colloids, the dried siliceous phase generally consists predominantly of polymeric silica forms that do not normally crystallize at ordinary drying temperatures.

The invention is further described below with reference to the following examples, which are intended to be illustrative rather than limiting.

EXAMPLE 1

A composite coating suspension is formed by mixing a quantity of an abrasion-resistant silicon carbide powder (1200 grit) with a water-based alkali silicate solution. The alkali silicate solution is a commercially available Kasil® potassium silicate solution containing 30% potassium silicate and the remainder water by weight. The silicon carbide powder is added to the potassium silicate solution in a proportion of 0.8 parts carbide to each 1 part of solution by weight, with thorough mixing to produce a flowable solution wherein the powder was well-dispersed.

A thin-walled cordierite honeycomb structure is selected for coating, that structure having a cell density of about 140 channels per square centimeter of honeycomb cross-section transverse to the direction of channel orientation and a channel wall thickness of about 60 µm. A coating covering one end surface and small adjoining length of skin and channel wall surfaces is applied to the honeycomb by dipping it end-wise into the composite coating suspension, followed by the removal of excess solution from channel wall surfaces by channel clearing with compressed air.

The thus-coated honeycomb structure is next dried for one hour in ambient air, followed by a short baking treatment at 100° C. to complete the removal of water from the coating layer. A ceramic honeycomb article comprising a well-bonded and durable composite coating on one end of the honeycomb structure is thus provided.

The coated honeycomb article thus produced is evaluated for erosion resistance along with a ceramic honeycomb structure of the same composition and geometry, but not provided with the composite coating. The evaluations involve the use of an accelerated erosion test wherein the ends of both the coated and uncoated honeycombs are exposed to a high velocity gas stream containing a substantial component of abrasive particulate, the abrasive particulate in this case consisting of a silicon carbide powder of 100 µm particle size that is introduced into the impinging gas stream at a feed rate of 2.6 g/minute. Following this exposure, both the coated and uncoated honeycombs are weighed to determine the extent of weight loss resulting from the erosion of honeycomb end surfaces by the stream of abrasive particulate.

The erosion resistance of the honeycomb structure provided with the composite coating is found to be significantly higher in this test than that of the unprotected honeycomb. Under identical testing conditions, the erosion weight loss experienced by the coated honeycomb article is measured at 0.034 g, while the weight loss of the unprotected honeycomb is measured at 0.084 g.

Figure 2:
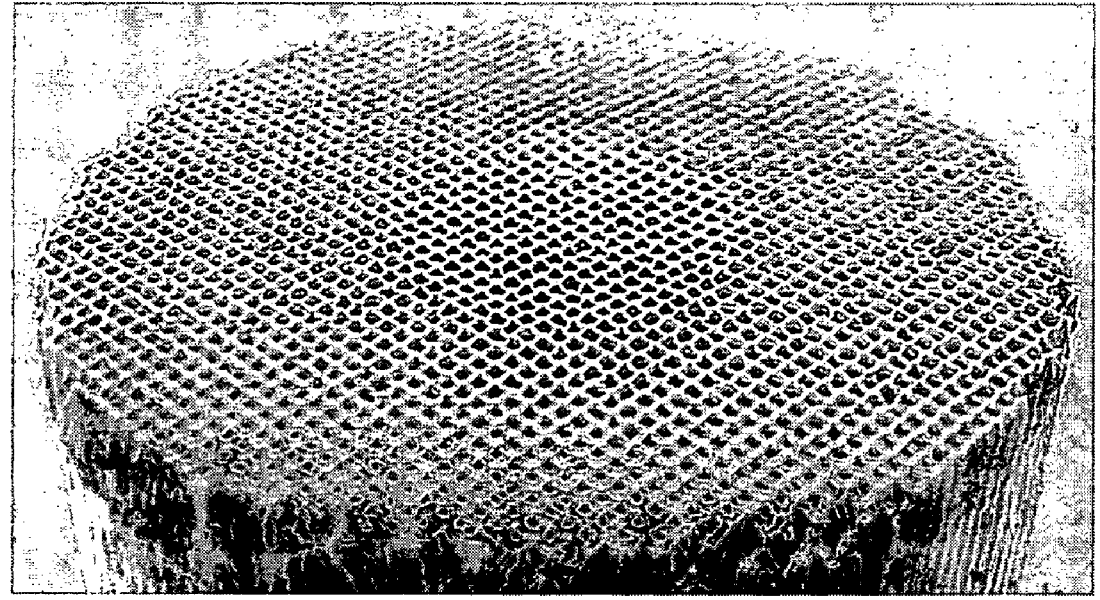
FIG. 2 illustrates a ceramic honeycomb article provided in accordance with the invention after exposure to the flowing gas mentioned above with reference to FIG. 1.

Representative effects of prolonged exposures of coated and un-coated honeycombs to abrasive test gas streams such as described above are illustrated in FIGS. 1 and 2 of the drawings. FIG. 1 is a photograph of an end face of an unprotected thin-walled honeycomb exposed to such a gas stream for a particular test period, while FIG. 2 is a photograph of a similar honeycomb provided with a protective composite coating such as above described after exposure for the same test period. The resulting substantial erosion of the unprotected honeycomb structure is evident, while little damage to the honeycomb provided with the protective composite coating is apparent.

As previously mentioned, it is a key requirement of erosion-resistant coating approaches that the applied coatings do not significantly increase flowing gas pressure drop through the coated honeycombs under typical engine exhaust gas treatment conditions. Back pressure tests performed on full-sized cordierite ceramic honeycomb structures with geometries similar to those disclosed in this Example show essentially no difference in honeycomb pressure drop as between honeycombs coated in accordance with this Example and un-coated honeycombs of the same configuration. Thus these composite coatings can impart high erosion resistance to thin-walled honeycomb without any apparent pressure drop penalty arising from the use of the coatings.

EXAMPLE 2

The preparation of a composite coating suspension in accordance with the procedure described in Example 1 is repeated, except that the abrasion-resistant ceramic powder selected for inclusion in the suspension is a particulate vermiculite having a maximum particle size below 200 mesh U.S. Standard Sieve. Further, in this case the vermiculite powder is added with mixing to the potassium silicate solution in a proportion of 1 part of vermiculite to 4 parts of potassium silicate solution by weight.

The application and drying of this composite coating suspension to a ceramic honeycomb structure identical to that coated in Example 1 is carried out following the same procedure employed in that Example. The coated honeycomb is then subjected to the same accelerated erosion test as therein described. The result is that the protectively coated sample experiences a weight loss of only 0.034 g in the course of testing, again demonstrating a significant increase in erosion resistance over that of identical but uncoated honeycomb samples.

EXAMPLE 3

The coating preparation procedure of Example 1 is again repeated, except that the abrasion-resistant powder employed in formulation of the composite coating solution is powdered crystalline cordierite of 10 µm average particle size, with a maximum particle size below 200 mesh U.S. Standard Sieve. The cordierite powder is added to the potassium silicate solution in a proportion of 0.8 parts of powder to each 1 part of solution by weight.

Following coating, drying and accelerated abrasion testing as described in Example 1 above, a sample cordierite honeycomb structure of identical cell density and wall thickness to that employed in Example 1, but provided with a composite protective coating as described in this Example 3, is found to experience a weight loss of 0.055 g following the abrasion test. While not quite as effective in increasing erosion resistance as the composite coatings of Examples 1 and 2, therefore, these composite coatings nevertheless exhibit an unexpected level of erosion protection given the similarity in composition and properties between the abrasion-resistant powder component of the composite coatings and the underlying cordierite ceramic structure being protected.

It will be appreciated from the foregoing description that the specific examples of the invention disclosed above are merely illustrative of the various embodiments thereof that may be adapted for particular uses within the scope of the appended claims.

We claim:

1. A ceramic honeycomb article comprising a ceramic honeycomb structure incorporating a plurality of parallel channels bounded by channel walls traversing the body from a first end face to a second end face thereof, and a composite coating disposed on at least one end face of the honeycomb structure, the composite coating comprising a vermiculite powder dispersed within a dried siliceous matrix.

2. A ceramic honeycomb article in accordance with claim 1 wherein the ceramic honeycomb structure is a thin-walled cordierite honeycomb structure having channel walls of a thickness in the range of 20-100 μm.

3. A ceramic honeycomb article in accordance with claim 1 wherein the dried siliceous matrix is composed of an alkali silicate.

4. A ceramic honeycomb article in accordance with claim 1 wherein the composite coating covers at least one endface and portions or the adjoining channel walls of the ceramic honeycomb structure.

5. A method for improving the durability of a ceramic honeycomb structure which comprises applying to at least one end face of the honeycomb structure a coating layer of a flowable suspension comprising powdered vermiculite dispersed in a water-based liquid vehicle selected from the group consisting of silicate solutions and silica suspensions; and drying the coating layer to provide a substantially water-free composite coating of the powdered vermiculite in a dried siliceous matrix.

6. A method in accordance with claim 5 wherein the water-based liquid vehicle is an alkali silicate solution.

7. A method in accordance with claim 5 wherein drying comprises heating the honeycomb structure and coating layer to a temperature sufficient to substantially remove water from the coating layer but below the sintering temperature of the siliceous matrix.

8. A method in accordance with claim 5 wherein the coating layer is applied by dipping.

* * * * *